(12) United States Patent
Grady et al.

(10) Patent No.: US 7,729,537 B2
(45) Date of Patent: Jun. 1, 2010

(54) EDITING OF PRESEGEMENTED IMAGES/VOLUMES WITH THE MULTILABEL RANDOM WALKER OR GRAPH CUT SEGMENTATIONS

(75) Inventors: Leo Grady, Yardley, PA (US); Gareth Funka-Lea, Cranbury, NJ (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 975 days.

(21) Appl. No.: 11/493,315

(22) Filed: Jul. 26, 2006

(65) Prior Publication Data

US 2007/0025616 A1     Feb. 1, 2007

Related U.S. Application Data

(60) Provisional application No. 60/704,305, filed on Aug. 1, 2005.

(51) Int. Cl.
*G06K 9/34* (2006.01)
(52) U.S. Cl. .................... 382/173; 345/619
(58) Field of Classification Search ............ 382/160, 382/173; 345/619
See application file for complete search history.

(56) References Cited

U.S. PATENT DOCUMENTS

2003/0099390 A1* 5/2003 Zeng et al. .................. 382/131
2004/0008886 A1   1/2004 Boykov
2006/0147126 A1   7/2006 Grady

OTHER PUBLICATIONS

Meila et al. "Learning Segmentation by Random Walks", MIT Press Advances in Neural Information Processing Systems 13, Dec. 2001, pp. 873-879.*
Kumar et al. "Obj Cut"; IEEE Computer Society Conference on Computer Vision and Pattern Recognition (CVPR'05); vol. 1, Jun. 2005, pp. 18-25.*
Boykov et al. "Interactive Graph Cuts for Optimal Boundary & Region Segmentation of Objects in N-D Images"; Proceedings of International Conference on Computer Vision, Jul. 2001, vol. I pp. 105-112.*
Meila et al. "A Random Walks View of Spectral Segmentation"; in AI and Statics (AISTATS) Feb. 14, 2001.*
Zheng et al. "Automatic determination of intrinsic cluster number family in spectral clustering using random walk on graph"; International Conference on Image Processing (ICIP) Oct. 2004, vol. 5, pp. 3471-3474.*
Freedman D et al: "Interactive Graph Cut Based Segmentation with Shape Priors" Computer Vision and Pattern Recognition, 2005. CVPR 2005. IEEE Computer Society Conference on San Diego, CA, USA, Jun. 20-26, 2005, Piscataway, NJ, USA, IEEE, Jun. 20, 2005, pp. 755-762, XP010817349 ISBN: 0-7695-2372-2 *abstract*; Others; 2005; US.

(Continued)

*Primary Examiner*—Vikkram Bali
*Assistant Examiner*—Eueng-Nan Yeh
(74) *Attorney, Agent, or Firm*—Donald B. Paschburg

(57) ABSTRACT

Presegmentation or prior, pre-existing segmentation of an object obtained through other means will be presented for interactive editing of a segmented object in an image or volume. Prior segmentation will be seamlessly combined with graph cuts or the random walker methods. Editing of the presegmentation is possible, while maintaining the important property of both methods that an arbitrary segmentation may be achieved with enough interaction.

17 Claims, 7 Drawing Sheets

OTHER PUBLICATIONS

Grady L et al: "Multi-label image sementation for medical applications based on graph-theoretic electrical potentials" Lecture Notes in Computer Science, Springer Verlag, Berlin, DE, vol. 3117, 2004, pp. 230-245, XP008084681 ISSN: 0302-9743 *abstract* *sections 2.1 and 2.5*; Others; 2004; DE.

Boykov et al., Interactive Graph Cuts for Optimal Boundary & Region Segmentation of Objects in N-D Images, Proceedings of International conference on Computer Vision, Jul. 2001.

Cremers et al., Diffusion Snakes: Introducing Statistical Shape Knowledge into the Mumford'Shah Functional, Kluwer Academic Publishers, 2002.

Elder et al., Image Editing in the Contour Domain, IEEE Transactions on Pattern Analysis and Machine Intelligence, vol. 23, No. 3, Mar. 2001.

Falcao et al., User Steered Image Segmentation Paradigms: Live Wire and Live Lane, Graphical Models and Image Processing 60, 233-260, 1998.

Kang et al., Interactive 3D Editing Tools for Image Segmentation, Medical Image Analysis 8, 35-46, 2004.

Lefohn et al., Interactive, GPU—Based Level Sets for 3D Segmentation.

Leventon et al., Statistical Shape Influence in Geodesic Active Contours, Proc. Conf. Computer Vision and Pattern Recognition, vol. 1, Hilton Head Island, SC, Jun. 13-15, 2000, pp. 316-323.

Boykov et al., Interactive Graph Cuts for Optimal Boundary & Region Segmentation of Objects in N-D Images, Proceedings of International conference on Computer Vision, vol. I, Jul. 2001, pp. 105-112.

Cremers et al., Diffusion Snakes: Introducing Statistical Shape Knowledge into the Mumford'Shah Functional, International Journal of Computer Vision, vol. 50, No. 3, pp. 295-313, Dec. 2002.

Elder et al., Image Editing in the Contour Domain, IEEE Transactions on Pattern Analysis and Machine Intelligence, vol. 23, No. 3, pp. 291-296, Mar. 2001.

Falcao et al., User Steered Image Segmentation Paradigms: Live Wire and Live Lane, Graphical Models and Image Processing 60, pp. 233-260, 1998, (Earlier than this application Aug. 1, 2005).

Kang et al., Interactive 3D Editing Tools for Image Segmentation, Medical Image Analysis 8, pp. 35-46, 2004, (Earlier than this application Aug, 1, 2005).

Lefohn et al., Interactive, GPU—Based Level Sets for 3D Segmentation, *MICCAI 2003* (2003), pp. 564-572, (Earlier than this application Aug. 1,2005).

* cited by examiner

US 7,729,537 B2

EDITING OF PRESEGEMENTED IMAGES/VOLUMES WITH THE MULTILABEL RANDOM WALKER OR GRAPH CUT SEGMENTATIONS

CROSS-REFERENCE TO RELATED APPLICATIONS

This application claims the benefit of U.S. Provisional Application No. 60/704,305 filed Aug. 1, 2005, which is incorporated herein by reference.

BACKGROUND OF THE INVENTION

The present invention relates to the segmentation of anatomical structures and more particularly to the use and editing of previously incomplete or incorrect segmentation of structures to achieve a correct segmentation.

Automatic segmentations of targets in images/volumes often require some degree of editing to meet the needs of a particular user (e.g., a physician). The question that the present invention will address is: Given a pre-existing segmentation (obtained through other means, e.g. an automatic algorithm), how does one edit the segmentation to correct problems that have occurred in a presegmentation step? A semi-automated segmentation algorithm like graph cuts is described in Y. Boykov and M.-P. Jolly, "*Interactive graph cuts for optimal boundary & region segmentation of objects in N-D images*" in *International Conference on Computer Vision*, vol. I, July 2001, pp. 105-112, and the recently introduced random walker segmentation method was disclosed in U.S. patent application Ser. No. 11/029,442, filed Jan. 5, 2005, which is hereby incorporated by reference. It is also described in L. Grady and G. Funka-Lea, "Multi-label image segmentation for medical applications based on graph-theoretic electrical potentials," in *Computer Vision and Mathematical Methods in Medical and Biomedical Image Analysis. ECCV* 2004 *Workshops CVAMIA and MMBIA*, ser. Lecture Notes in Computer Science, M. Sonka, I. A. Kakadiaris, and J. Kybic, Eds., no. LNCS3117. Prague, Czech Republic: Springer, May 2004, pp. 230-245. These segmentation methods provide a high-quality intuitive interface for allowing a physician/user to segment images, but are not formulated to allow for importation or use of a prior segmentation. In the present invention, it will be shown how a prior segmentation may be seamlessly combined with graph cuts or the random walker algorithm to allow for editing, while maintaining the important property of both algorithms that an arbitrary segmentation may be achieved with enough interaction. The term presegmentation will be used to refer to the prior, pre-existing segmentation obtained through other means that will be presented for editing. Accordingly novel methods are required which can edit incorrect or incomplete presegmentations to achieve a correct segmentation of volumes and images.

SUMMARY OF THE INVENTION

The present invention in accordance with one aspect provides novel methods and systems for editing presegmented images and volumes to achieve desired segmentation results.

In accordance with a further aspect of the present invention a method is provided for processing an object in a set of image data comprising: presegmenting the object using a first segmentation process; analyzing the presegmentation of the object and determining a weighting factor based on the analysis of the presegmentation; placing one or more seeds in the set of image data; and segmenting the object using a second segmentation process using the seeds and the weighting factor and the results from the first segmentation process.

In accordance with another aspect of the present invention a method is provided wherein the second segmentation process is a graph cuts method.

In accordance with a further aspect of the present invention a method is provided wherein the second segmentation process is a random walker method.

In accordance with another aspect of the present invention a method is provided wherein the weighting factor is a function of the distance of the presegmented object from one or more seeds.

In accordance with a further aspect of the present invention a method is provided wherein the weighting factor is a function of the minimum distance between presegmentation and seeds expressed as $$y_i = \kappa \exp\left(-\frac{d(v_i, v_j)}{\sigma}\right),$$

wherein the factors $\kappa$ and $\sigma$ are user controlled constants. These constants depend on the application, on the type of data and on user preference. Herein $d(v_i, v_j)$ is the minimum distance from vertex $v_i$, to all vertices $v_j \in F, B$ with F and B being the set of foreground and background seeds respectively.

In accordance with another aspect of the present invention a method is provided wherein the step of segmenting the object using a second segmentation process with one or more seeds, the results of the first segmentation process and the weighting factor includes minimizing the energy expression $$Q(x) = \sum_{e_{ij}} w_{ij}(x_i - x_j)^2 + \gamma\left(\sum_i (1 - p_i)x_i + \sum_i p_i(1 - x_i)\right).$$

The minimization of the energy expression may further be constrained by editing sets of nodes. In the expression $e_{ij}$ denotes an edge, spanning two vertices, $v_i$ and $v_j$. A weighted graph assigns a value to each edge called a weight. The weight of an edge, $e_{ij}$, is denoted by $w(e_{ij})$ or $w_{ij}$. A presegmentation of a node, determined by another process (e.g., a separate, automatic segmentation algorithm) is represented as $p_i$, which can have a value 0 or 1, depending on the presegmented value of the node. The term $x_i$, represents a constraint $$x_i = \begin{cases} 1 & \text{if } v_i \subset F, \\ 0 & \text{if } v_i \subset B. \end{cases}$$

The term $\gamma$ is a parameter indicating the strength of the presegmentation.

In accordance with a further aspect of the present invention a method is provided wherein one or more additional seeds are added to the set of image data.

In accordance with another aspect of the present invention a method is provided wherein one or more seeds are removed from the set of image data.

In accordance with a further aspect of the present invention a method is provided wherein the weighting factor is interactively modified. In accordance with another aspect of the present invention a method is provided wherein the weighting factor is interactively modified by changing κ or σ.

In accordance with a further aspect of the present invention a system is provided for processing an object in a set of image data comprising: a processor and computer software operable on the processor, the computer software being capable of: presegmenting the object using a first segmentation process; analyzing the presegmentation of the object and determining a weighting factor based on the analysis of the presegmentation; placing one or more seeds in the set of image data; and segmenting the object using a second segmentation process using the seeds and the weighting factor and the results from the first segmentation process.

In accordance with another aspect of the present invention a system is contemplated that implements the methods of the present invention.

DESCRIPTION OF A PREFERRED EMBODIMENT

Figure 1:
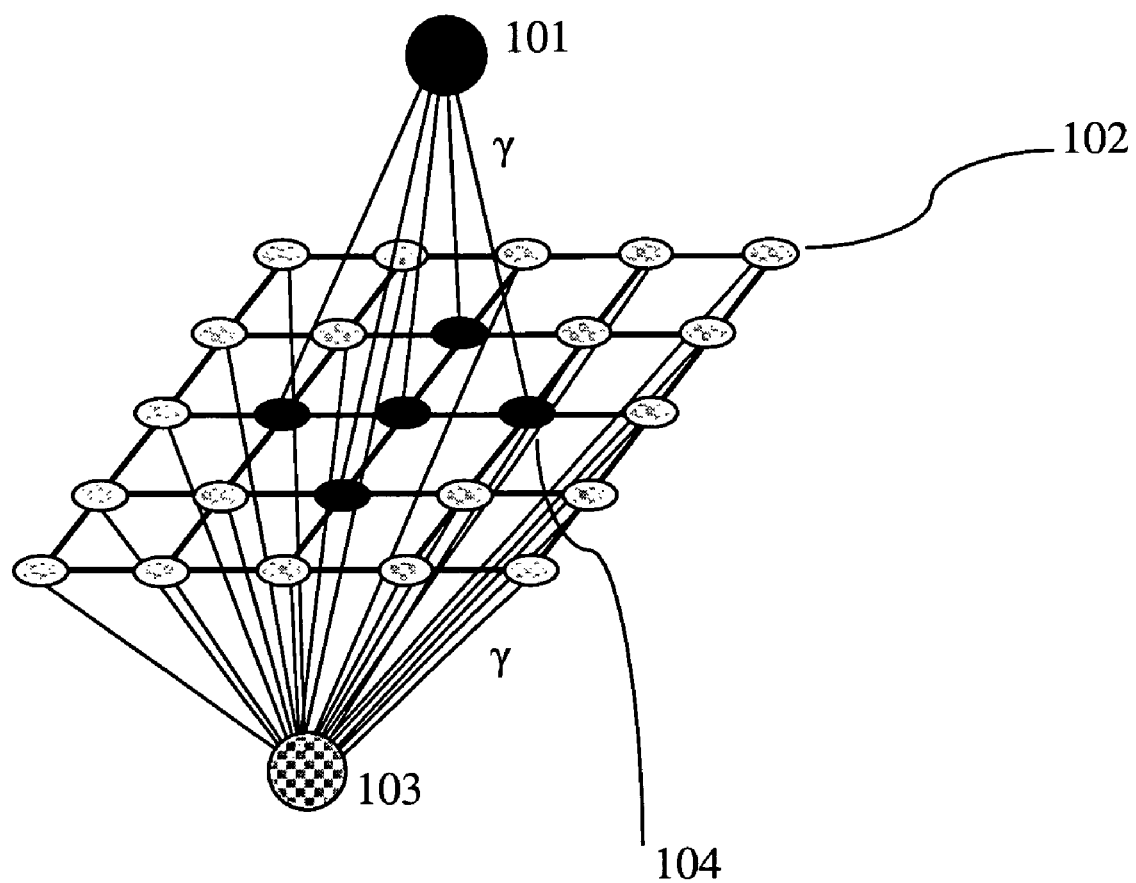
FIG. 1 provides a diagram of a graph for using presegmentation

Methods that incorporate presegmentations into their operation are rare. To the best of the inventors' knowledge previous approaches have focused almost exclusively on using a prior segmentation as an initialization to an algorithm that finds a local energy minimum of a predefined model. Active contour and level set algorithms such as described in: "J. A. Sethian. *Level Set Methods and Fast Marching Methods*, ser. Cambridge Monograph on Applied and Computational Mathematics. Cambridge University Press, 1999" are the most prominent examples of this approach. The major difficulty with these approaches is that it is difficult to incorporate user editing (if the new segmentation is insufficient), especially if the desired segmentation does not represent a local minimum of the algorithm model. It is noted that early research in active contours (i.e., snakes) did incorporate an aspect of user interaction in the form of "volcanos" originally proposed by Kass et al. in "M. Kass. A. Witkin, and D. Terzopoulos, "Snakes: Active contour models," *International Journal of Computer Vision*, vol. 1, no. 4, pp. 321-331, 1987." An important quality of the approach that is part of the present invention is that, regardless of the quality of the presegmentation, the user may obtain any desired segmentation with enough work (i.e., placement of enough seeds).

Additional work has focused on using prior (or learned) shapes to guide a segmentation (such as described in "M. S. Leventon, W. B. L Grimson, and O. Faugeras, "Statistical shape influence in geodesic active contours," in *Proc. Conf Computer Vision and Pattern Recognition*, vol. 1, Hilton Head Island, S.C., Jun. 13-15, 2000, pp. 316-323." and "D. Cremers, F. Tischhäuser, J. Weickert, and C. Schnörr, "Diffusion snakes: Introducing statistical shape knowledge into the Mumford-Shah functional," *International Journal of Computer Vision*, vol. 50, no. 3, pp. 295-313, December 2002."). One may consider the presegmentation in the present invention as a prior shape that is appropriately scaled and registered. However, unlike the use of prior shape models in these approaches, the method which is an aspect of the present invention is both interactive and allows the user to obtain an arbitrary segmentation, regardless of the quality of the presegmentation.

The editing task can be formulated as an energy minimization problem. The present invention provides methods how it may be optimized with a modified graph cuts or random walker algorithm. Another view of the present invention is how a prior segmentation may be seamlessly combined with graph cuts or the random walker algorithm to allow for editing, while maintaining the important property of both algorithms that an arbitrary segmentation may be achieved with enough interaction. Experience with clinicians has demonstrated that an editing tool for image or volume segmentation is expected to have the following characteristics:

1. Operate locally to the interaction site.
2. Operate quickly.
3. Produce modifications in 3D, not just on the viewing slice.
4. Produce intuitive solutions.

The graph cuts and random walker interactive segmentation algorithms appear to be good candidates for editing. Both algorithms require the user to place marks with a mouse (hereafter referred to as seeds), to indicate a few pixels belonging to the fore-ground/background of the target object. These seed locations are then used to produce a full 3D segmentation (labeling the pixels or voxels of the image as foreground or background). A characteristic of the algorithms is that an undesired segmentation may be easily modified by adding new seeds, which typically results in faster processing of the updated segmentation. As an aspect of the present invention one would like to preserve the quality of fast modification of the segmentation but, instead of being given a previous set of seeds, accept a previous complete segmentation produced by another algorithm. Use of these known algorithms for editing therefore requires that the character of these algorithms as being fast, 3D, and intuitive is preserved, while enforcing a locality of operation.

Implicit in the requirements for local operation and intuitive results is a requirement for stability. In particular, when editing is invoked the presegmented result should not change if the user chooses not to interact. This requirement is not met by many potential approaches. If the editing will be done at a pixel level and the presegmentation is at a subpixel resolution then the first step of the editing will be a pixelation of the presegmentation which will change the results due to sampling even if the user does not change the label of a single pixel. The editing described as an aspect of the present invention will be at a pixel level and it is assumed that the presegmentation is at the same level of resolution. Another effect can also lead to instability when initiating editing—if the data driven editing is formulated as an optimization, and the current presegmentation is not a local optimum, then the segmentation result will change with the optimization even without user input. Since the source of the presegmentation is unknown, the optimization will be formulated in such a way that the presegmentation is a global optimum without user input.

As stated by Kang et al. in Kang, Y., Engelke, K., Kalender, W. A.: Interactive 3D editing tools for image segmentation. Medical Image Analysis 8 (2004) 35-46" . . . the literature on editing tools in general and on 3D tools in particular is sparse." In fact, many publications on medical image segmentation explicitly assume the availability of a manual editing tool to correct undesirable results. Although some user interaction is clearly necessary, the goal of the present invention is to provide a tool that requires minimal user interaction to achieve the desired, edited, result. The cited article by Kang et al. introduces three tools for interactive correction of a presegmented structure. The first tool allows the user to select a Volume of Interest (VOI), within which holes in the segmentation are filled. The second tool allows a user to bridge points in the segmentation to indicate to the hole-filling system that a volume in the segmentation should be filled. The final tool introduces control points on the presegmented surface that the user is allowed to drag/modify. Modification of a control point on the boundary introduces a displacement field on nearby control points that results in the displacement of a boundary region in the neighborhood of the modified control point. Each of these tools has the drawback that the image content is ignored in modifying the presegmentation. In the approach presented here, the user seeds, presegmentation and image content all impact the edited segmentation.

There are a number of tools for interactive segmentation in 2D described in Falcão, A. X., Udupa, J. K., Samarasekera, S., Sharma, S., Elliot, B. H., de A. Lotufo, R.: User-steered image segmentation paradigms: Live wire and live lane. Graphical Models and Image Processing 60 (1998) 233-260; [14] Mortensen, E., Barrett, W.: Interactive segmentation with intelligent scissors. Graphical Models in Image Processing 60(5) (1998) 349-384; Elder, J. H., Goldberg, R. M.: Image editing in the contour domain. IEEE Transactions on Pattern Analysis and Machine Intelligence 23(3) (2001) 291-296; and 3D tools are described in Boykov, Y., Jolly, M. P.: Interactive organ segmentation using graph cuts. In: Medical Image Computing and Computer-Assisted Intervention, Pittsburgh, Pa.(2000) 276-286; Lefohn, A. E., Cates, J. E., Whitaker, R. T.: Interactive, GPU-based level sets for 3D segmentation. In: Medical Image Computing and Computer Assisted Intervention (MICCAI). (2003) 564-572; Grady, L.: Multilabel random walker image segmentation using prior models. In: Proceedings of the 2005 IEEE Computer Society Conference on Computer Vision and Pattern Recognition. Volume 1 of CVPR., San Diego, IEEE, IEEE (2005) 763-770. However, none of these cited tools are formulated to make use of a presegmentation. In addition there is a large body of literature in the computer aided design and computer graphics communities that looks at graphical model editing, but the editing is done without the influence of image data. The present invention is related to the large body of work on image segmentation using shape priors (see, for instance M. S. Leventon, W. B. L Grimson, and O. Faugeras, "Statistical shape influence in geodesic active contours," in *Proc. Conf Computer Vision and Pattern Recognition*, vol. 1, Hilton Head Island, S.C., Jun. 13-15, 2000, pp. 316-323. [8] D. Cremers, F. Tischhäuser, J. Weickert, and C. Schnörr, "Diffusion snakes: Introducing statistical shape knowledge into the Mumford-Shah functional," *International Journal of Computer Vision*, vol. 50, no. 3, pp. 295-313, December 2002; Cootes, T. F., Hill, A., Taylor, C. J., Haslam, J.: Use of active shape models for locating structures in medical images. Image Vision Comput. 12(6) (1994) 355-365; Rousson, M., Paragios, N.: Shape priors for level set representations. In: Proc. of ECCV 2002. Volume 2. (2002) 78-92; Kumar, M. P., Torr, P. H., Zisserman, A.: OBJ CUT. In: Proc. of CVPR 2005. Volume 1. (2005) 18-25; Freedman, D., Zhang, T.: Interactive graph cut based segmentation with shape priors, in Proceedings of the IEEE Computer Society Conference on Computer Vision and Pattern Recognition (CVPR). Volume 1. (2005) 755-762.). The presegmentation in the present invention has some of the aspects of a shape prior. However, shape priors are built from a sampled distribution of shapes while in the case of a presegmentation there is only one instance of a prior shape. So, for the present problem, there is no learned uncertainty in the prior information. Instead, the goal is to deviate from the presegmentation locally to the interaction site and relative to the image data.

In order to meet the goal stated above that an unedited presegmentation returns the presegmentation as the optimum, a continuum formulation will be avoided out of concern that the discretization step might alter the presegmentation. Therefore, the formulation will be on a discrete space or, in general, a graph. A precise notion for a graph will be defined first. A graph as described in Harary, F.: Graph Theory. Addison-Wesley (1994), is comprised of a pair G=(V,E) with vertices (nodes) v ∈ V and edges e ∈E ⊆ V×V . An edge, e, spanning two vertices, $v_i$ ; and $V_j$, is denoted by $e_{ij}$. A weighted graph assigns a value to each edge called a weight. The weight of an edge, $e_{ij}$, is denoted by $w(e_{ij})$ or $w_{ij}$ and is assumed to be positive. The degree of a vertex is $$d_i = \sum w(e_{ij})$$

for all edges $e_{ij}$ incident on $v_i$. Each pixel (voxel) is associated with a node and it is assumed that each pixel (voxel) is connected by an edge to its four (six) cardinal neighbors.

As a next step define an affinity weighting between pixels (as done in L. Grady and G. Funka-Lea, "Multi-label image segmentation for medical applications based on graph-theoretic electrical potentials," in *Computer Vision and Mathematical Methods in Medical and Biomedical Image Analysis. ECCV* 2004 *Workshops CVAMIA and MMBIA*, ser. Lecture Notes in Computer Science, M. Sonka, I. A. Kakadiaris, and J. Kybic, Eds., no. LNCS3117. Prague, Czech Republic: Springer, May 2004, pp. 230-245; and the earlier cited article by Boykov et. al.) as given by the typical Gaussian weighting function $$w_{ij}=\exp(-\beta(g_i-g_j)^2), \quad (1)$$

where $g_i$ represents the grayscale intensity at node (pixel) $v_i$. The term β is a free parameter.

As a next step define a presegmentation, p, determined by another process (e.g., a separate, automatic segmentation algorithm), as $$p_i = \begin{cases} 1 & \text{if } v_i \text{ was presegmented as foreground} \\ 0 & \text{if } v_i \text{ was presegmented as background} \end{cases} \quad (2)$$

Then, given a segmentation p, define the editing problem as the minimization of the energy functional $$Q(x) = \sum_{e_{ij}} w_{ij}(x_i - x_j)^2 + \gamma\left(\sum_i (1-p_i)x_i + \sum_i p_i(1-x_i)\right), \quad (3)$$

with respect to the foreground indicator function x, defined on the nodes, where γ is a parameter indicating the strength of the presegmentation. This functional encourages the presegmentation and encourages a data-driven smoothness in the form of the first term. Note that, with a sufficiently large γ, the presegmentation will always be returned. Given a user-defined editing set of nodes (possibly empty) marked as foreground seeds F ⊂ V user-defined editing set of nodes (possibly empty) marked as background seeds, B ⊂ V, such that F ∩ B=∅, the seeds are incorporated into the minimization of equation (3) by performing a constrained minimization of Q(x) with respect to the constraints $$x_i = \begin{cases} 1 & \text{if } v_i \subset F, \\ 0 & \text{if } v_i \subset B. \end{cases} \quad (4)$$

The first term in equation (3) is the random walker segmentation process. Equations used in other segmentation process can also be used for the first term. The second term in equation (4) includes the results from a presegmentation process. A minimum value of Q(x) gives the new segmentation in accordance with one aspect of the present invention. A preferred method of solving for Q(x) is to use the Euler-LaGrange equation for this type of equation which involves a Laplacian matrix, as discussed herein.

If the minimization of Q(x) in equation (3) is forced to give a binary-valued optimum, x, for all unseeded nodes, then the minimization of equation (3) is given by the graph cuts algorithm described in earlier cited article by Boykov et. al in the construction of which an illustrative example is provided in FIG. 1. In the terminology of earlier cited article by Boykov et. al, seeds are given by F, B, N-links have weight $w_{ij}$ and each node, $v_i$, is connected via a T-link to a foreground (if $p_i=1$) or background (if $p_i=0$) "supernode" with weight γ. If the optimization of equation (3) is performed with respect to a real-valued x (afterward thresholded at 0.5 to produce a "hard" segmentation) the random walker algorithm may be performed with the same weighted graph construction given here and illustrated in FIG. 1 for graph cuts. The random walker method is described in Grady, L.: Multilabel random walker image segmentation using prior models, in: Proceedings of the 2005 IEEE Computer Society Conference on Computer Vision and Pattern Recognition. Volume 1 of CVPR., San Diego, IEEE, IEEE (2005) 763-770. Since the random walker has a provable robustness to noise (also described in the cited article by Grady) not offered by the graph cuts algorithm and because the "soft" confidence values for each node that are returned by the random walker algorithm are generally beneficial for visualization and smoothing purposes, the focus in the present invention will be on the random walker solutions for the editing problem given in equation (3). However it is understood that application of the graph cuts method is also possible.

One view of the editing formulation of (3) is as a statistical prior that is fed to the segmentation algorithm. Statistical priors may be incorporated into either the graph cuts or the random walker algorithm in the same manner—by connecting each node to a floating foreground/background (i.e., source/terminal) node with strength proportional to the prior (see the earlier cited articles [1,9]). FIG. 1 gives an example of this construction and a graphical interpretation of the editing formulation given a presegmentation. The dark pixels such as (104) and checkered pixels (such as 102) correspond to the presegmented foreground/background. The node 101 and node 103 are "supernodes" that are attached to the presegmented fore-ground/background with strength γ. The energy functional of equation (3) may be minimized by applying either the graph cuts (binary minimization) or the random walker (real-valued minimization) algorithm to this graph construction. User placed editing seeds may now be employed in the manner of the hard constraints used in the standard formulation of both algorithms.

The formulation given above satisfies three of the four design criteria for an inter-active editing algorithm. Modifications behave intuitively, are performed in 3D and the updates may be computed quickly (the reasons why this computation is more efficient in the case of the random walker is provided in the earlier cited article Grady, L.: Multilabel random walker image segmentation using prior models, In: Proceedings of the 2005 IEEE Computer Society Conference on Computer Vision and Pattern Recognition. Volume 1 of CVPR., San Diego, IEEE, IEEE (2005) 763-770;). However, the criterion of local operation is not incorporated into the above formulation, i.e., the segmentation could change at any location in the image. Therefore the presegmentation strength, γ, will be made a function of distance from the seed locations, i.e., $$\gamma = \kappa \exp\left(-\frac{d(v_i, v_j)}{\sigma}\right), \quad (5)$$

where $d(v_i,v_j)$ is the minimum distance from $v_i$ to all $v_j \in$ F,B. Therefore, the κ parameter indicates the overall strength of consideration given to the presegmentation and the parameter σ controls the locality of the modification given by the seeds.

The incorporation of intensity priors into the graph cuts and random walker algorithms was previously explored in: Y. Boykov, O. Veksler, and R. Zabih, "Fast approximate energy minimization via graph cuts," *IEEE Transactions on Pattern Analysis and Machine Intelligence*, vol. 23, no. 11, pp. 1222-1239, November 2001. U.S. Provisional Patent Application No. 60/641,904 by Leo Grady filed on Jan. 6, 2005 entitled: Multilabel Random Walker Segmentation Using Prior Models (which is hereby incorporated by reference); and L. Grady, "Multilabel random walker image segmentation using prior models," in *Proceedings of CVPR* 2005, in press. See also http://cns.bu.edu/~lgrady/grady2005multilabel.pdf for same. The cited references demonstrate that adding an intensity prior term is equivalent to attaching a foreground and background "supernode" to each node with the strength of the prior as a weight. In the present invention the presegmentation is viewed as a prior in the same sense and, given a presegmentation, attach each foreground node (pixel) to the foreground supernode with strength γ and each background node to the background supernode. As stated above an illustrative example of such a construction is shown in FIG. 1. FIG. 1 shows a construction for the employment of a presegmentation in a 5×5 lattice of pixels wherein dark pixels such as 104 represent presegmented foreground pixels and checkered pixels represent presegmented background pixels. The light grey node 101 and the light checkered node 102 represent "supernodes" that are attached to the presegmented foreground/background with strength γ. Given these additional supernodes and edges, seeds may be placed as in the original graph cuts and random walker algorithms and the segmentation may be applied. There are two major advantages of this construction:

1) The presegmentation guides the segmentation, but enough editing allows the user to achieve any arbitrary segmentation (i.e., the user is not constrained by the presegmentation).
2) The parameter γ allows a level of control of how firmly to weight the presegmentation. A high γ corresponds to a heavy weighting of the presegmentation and a low γ corresponds to a weak weighting.

An additional advantage, in the case of the random walker algorithm, is that one expects an increase in computation speed for the same reasons as the computation of intensity priors (see L. Grady, "Multilabel random walker image segmentation using prior models," in *Proceedings of CVPR* 2005, in press. See also http://cns.bu.edu/~lgrady/grady2005 multilabel.pdf for same).

Figure 2:
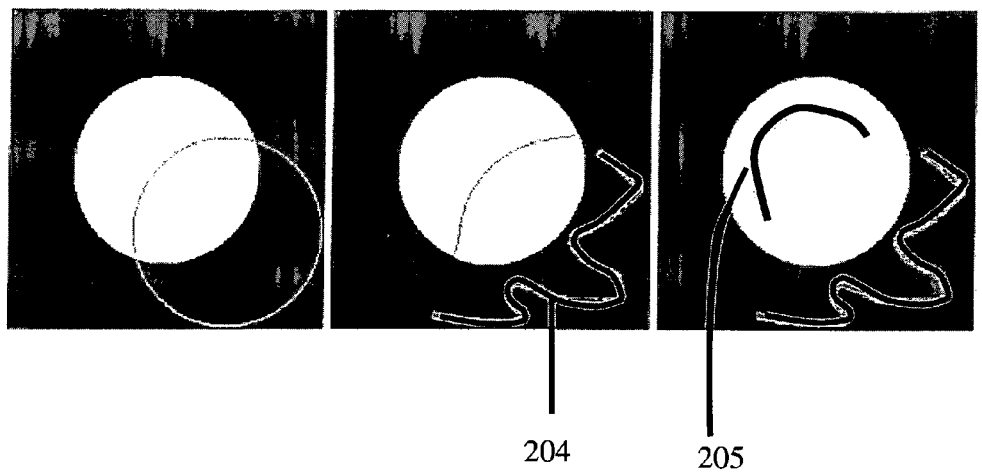
FIG. 2 illustrates different aspects of the present invention.

Since γ provides a measure of how strongly to bias the old segmentation in favor of the new (edited) segmentation, it is another aspect of the present invention to start γ at a large value and decrease in strength as more seeds are placed. Therefore, for cases where only a few seeds are placed (interpreted as requiring minor editing), the algorithm is heavily biased toward the old segmentation. However, when many seeds have been placed (presumably the presegmentation was of poor quality), the algorithm returns a segmentation biased toward the new segmentation. FIG. 2 demonstrates the behavior of the editing tool using the random walker algorithm in an illustrative example on a simple, synthetic image. Initially, a very poor presegmentation is given. The editing tool is able to correct a very poor initial segmentation of a trivial image: a white circle in a black background as shown in FIG. 2. FIG. 2 image 201 shows an image with (very poor) initial presegmentation. After background seeds (204) are placed, that portion of the presegmentation has been corrected, but the γ is strong enough to keep the piece of the presegmentation internal to the circle as is shown in image 202 of FIG. 2. In image 203 of FIG. 2 foreground seeds (205) are added and the segmentation obtained after adding the seeds is shown. So, after more foreground seeds are placed, the desired segmentation is achieved. Although relaxing γ as more seeds are placed gives a natural "interpolation" between the presegmentation and the random walker (or graph cuts) segmentation algorithm, there are situations where a tighter (or lesser) emphasis on the presegmentation could employ other methods on controlling or fixing γ.

Figure 3:
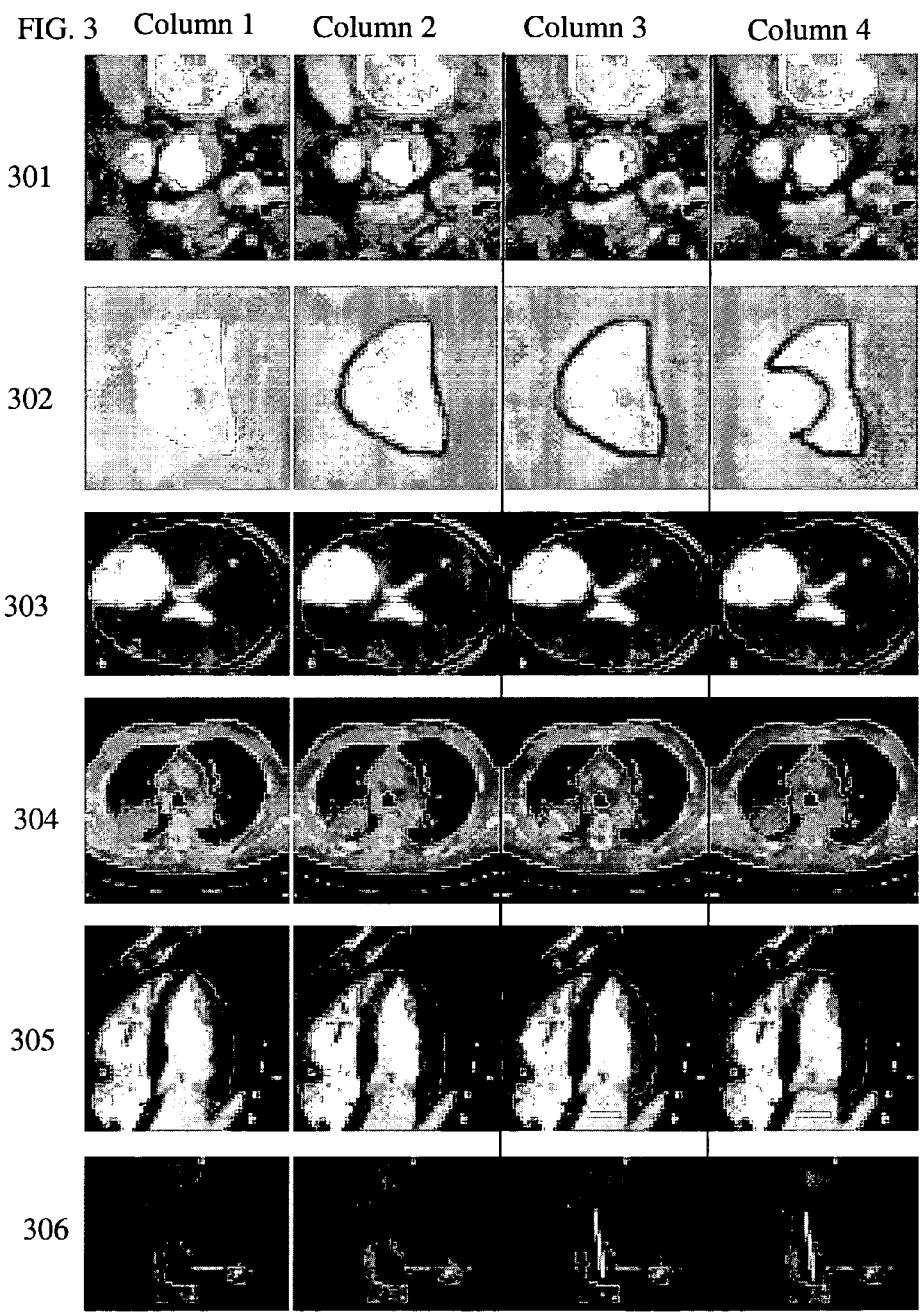
FIG. 3 provides an example of the use of the present invention.

Validation of an editing method such as provided here is difficult, since the ultimate metric of utility is the match between the intuition of the user and the result of the editing. However, it is possible to demonstrate with illustrative examples that the editing tool satisfies the design criteria of speed, locality and 3D operation. First 2D examples will be provided in order to characterize the algorithm behavior and report calculation speeds. FIG. 3 shows six examples (301, 302, 303, 304, 305 and 306) of images taken from different imaging modalities. For each image, an incorrect presegmentation was given from a separate system (e.g., an automatic segmentation algorithm) that a user would want to correct. The incorrect presegmentations are given in the second column, outlined in gray. A user may place foreground seeds to include regions excluded in the presegmentation, indicated by dark gray marks or background seeds to exclude regions included by the presegmentation, indicated by light gray marks. Although none of the examples in the second column include both foreground and background seeds, there is no limitation to using both seed types. The first, second, third and fourth column of FIG. 3 have the following significance: First column: The original image. Second column: The presegmentation (outlined in darker gray) provided by another system (e.g., an automatic algorithm). Third column: The user-placed seeds used to correct the segmentation. Dark gray seeds indicate that the user wants to include this region in the segmentation while light gray seeds indicate that the user wants to exclude this region from the segmentation. Fourth column: The updated segmentation.

These experiments were conducted on an Intel Xeon with a 2.40 GHz processor using a conjugate gradients solver for the random walker algorithm. From top to bottom—the aortic aneurysm CT image (301) had 512×512 pixels and the editing required 18.28 s, the bone CT image (302) had 512×512 pixels (cropped in the figure) and required 9.5 s, the brain tumor MR image (303) was 295×373and required 1.79 s, the lung tumor CT image (304) was 512×512 and required 23.67 s, the left ventricle CT image (305) was 256×256and required 1.95 s and the left ventricle ultrasound image (306) was 240×320 (cropped in the figure) and required 2.58 s for editing.

Figure 4:
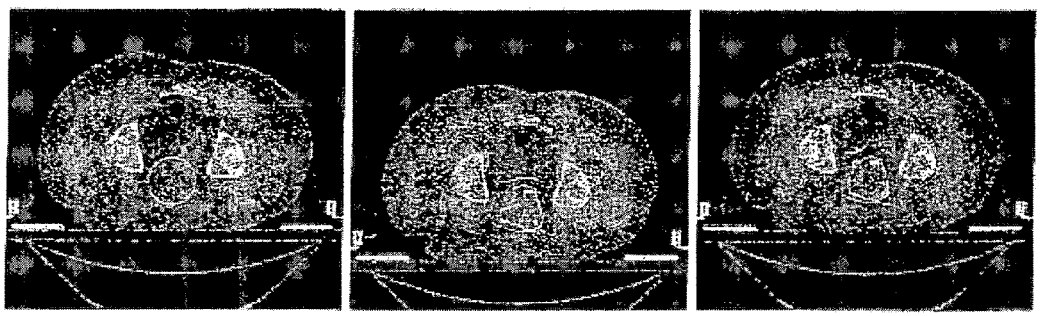
FIG. 4 provides another example of the use of the present invention.

For image segmentation problems where the presegmentation is "close" to the desired segmentation, the methods presented here allow for fewer seeds to achieve the desired segmentation. A further real life illustrative example is provided in FIG. 4. FIG. 4 shows the different segmentation stages of the bladder in an image. The presegmentation alone shown in 401 is insufficient. Likewise, if the seeds used to correct the presegmentation are employed alone (ignoring presegmentation) in the original random walkers framework, as is shown in 402 an incorrect result also obtains. However, if these seeds are employed in conjunction with the priors offered by the presegmentation, the algorithm yields the correct result. The seeds 404 are foreground (indicating bladder) seeds. The seeds 405 are background seeds. Combining seeds and presegmentation priors provides superior segmentation results compared to either using the presegmentation or the seeds alone.

Figure 5:
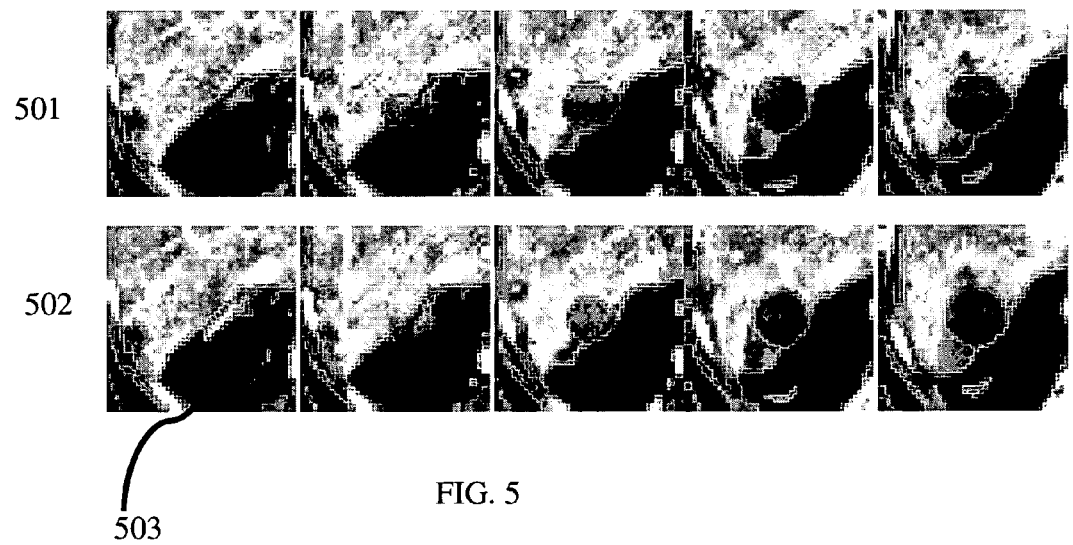
FIG. 5 provides a 3D example of the use of the present invention.

FIG. 5 shows the same experiment run on a 3D dataset of a liver tumor in which the presegmentation erroneously included surrounding tissue, due to a vessel passing nearby. Background seeds were placed on a single slice but, because the energy minimization is formulated on an arbitrary graph (in this case, a 3D lattice), the resulting solution effects all slices. In all slices the gray lines indicate the segmentation border. Images in top row 501 show: axial slices of the original segmentation of a liver tumor in CT with a leak into the surrounding tissue. Images in bottom row 502: the corrected segmentation of the axial slices, after placement of background (exclude) seeds in one slice by the user, given on the leftmost slice by the light seeds 503. Given this volume, cropped to 89×90×29, and using the same computer as in the 2D experiment, producing an edited solution in 3D required 3.95 s.

Perfectly reliable, automatic segmentation of an object in a medical image is unrealistic with today's existing segmentation technology. However, an automatic system may get close to the user-desired segmentation. Therefore, the availability of a smart editing tool is essential, since a manual correction is far too time consuming, especially in 3D data. The "scribble" interface of the graph cuts and random walker algorithms provide a natural user interface that allows the user to seed image regions to include or exclude in the edited segmentation. With the native definitions of these algorithms, both foreground and background regions must be seeded and information from a presegmentation cannot be used. In the present invention methods have been presented that show how the presegmentation may be used to frame the editing problem in an energy minimization framework that permit optimization with either the graph cuts or random walker algorithm, depending on whether or not segmentation confidences are required.

The energy minimization framework of the present invention was tested on several 2D and 3D editing examples (using the random walker minimization) and the results were displayed in FIGS. 2, 3, 4 and 5 with timing information. Overall, the energy minimization framework provides a meaningful, smart, image-dependent method of editing a presegmented volume with known minimization techniques. The editing presented here satisfies the stated desired qualities of an editing algorithm in that the edited segmentation is obtained locally, quickly, intuitively and operates in 3D. Accordingly, methods have been provided for using the high-quality, graph cuts and random walker segmentation tools to edit an incorrect segmentation obtained through other means. Although automatic segmentation algorithms will remain a focus of intense study, it should be recognized that there will continue to be situations in which the automatic segmentation results will not meet the needs of the physician/user. For these cases, a fast, high-quality, interactive segmentation tool is necessary. The advantages of the methods here provided are that an arbitrary segmentation may be obtained (regardless of the initial quality of the presegmentation) and that control is achieved over how biased the edited segmentation should be toward the presegmentation.

Figure 6:
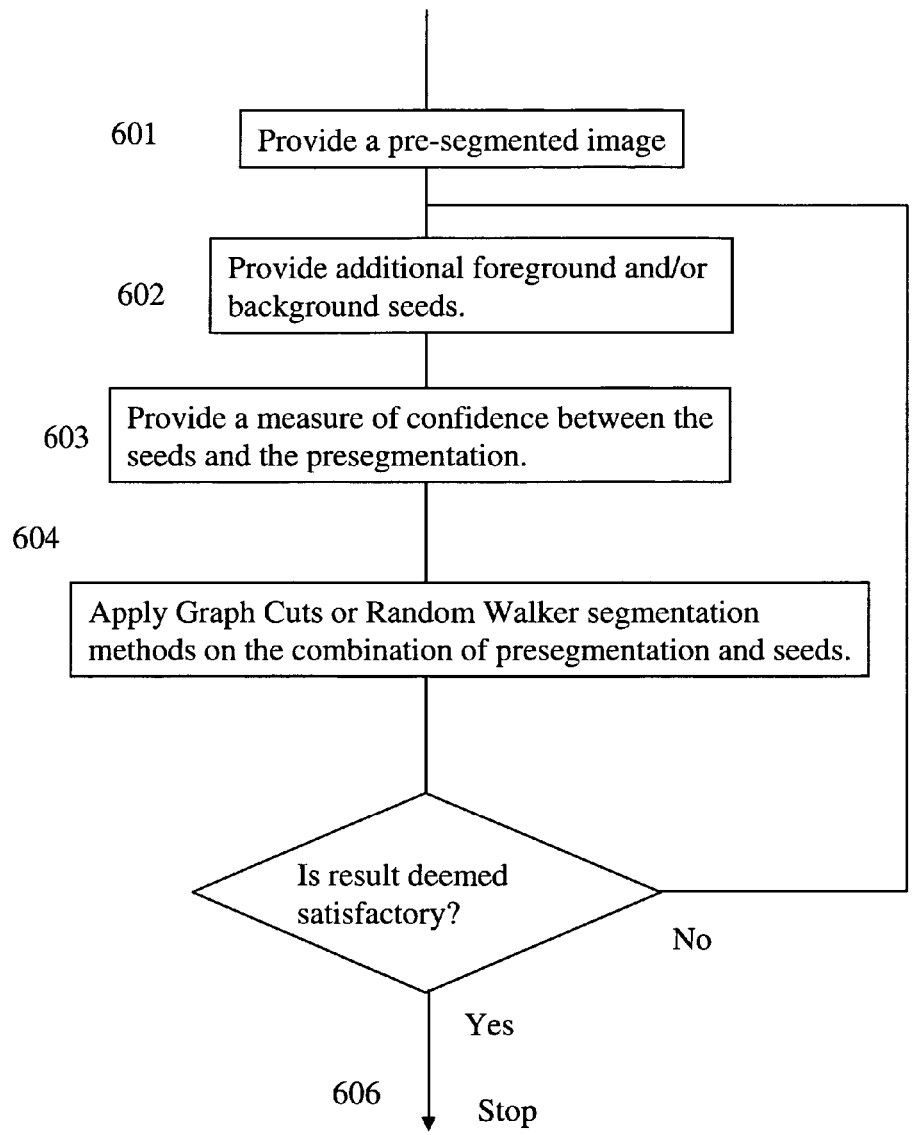
FIG. 6 provides a flow chart describing one aspect of the present invention.

FIG. 6 is a flow diagram showing in high level the method of the present invention and the steps which are comprised in the method. In step 601 a presegmentation is provided. In step 602 a user can add one or more foreground or background seeds. In step 603 a user can assign a measure of confidence $\gamma$ to the presegmentation nodes. The factor $\gamma$ can also be controlled automatically for instance by the number of added seeds. In step 604 the graph created by seeds, presegmentation and volume/image data will then be processed according to a Graph Cuts or a Random Walker segmentation method. The result will be evaluated by a user. If the result is not deemed satisfactory the user may start the process again and add additional seeds and/or adjust the confidence factor. In a next round through the steps the user may add one or more new seeds (step 602). It is understood that the user may also remove one or more seeds. The user may also remove one or more seeds and/or add one or more seeds. The user may also change or not change the measure of confidence between the seeds and the presegmentation.

Figure 7:
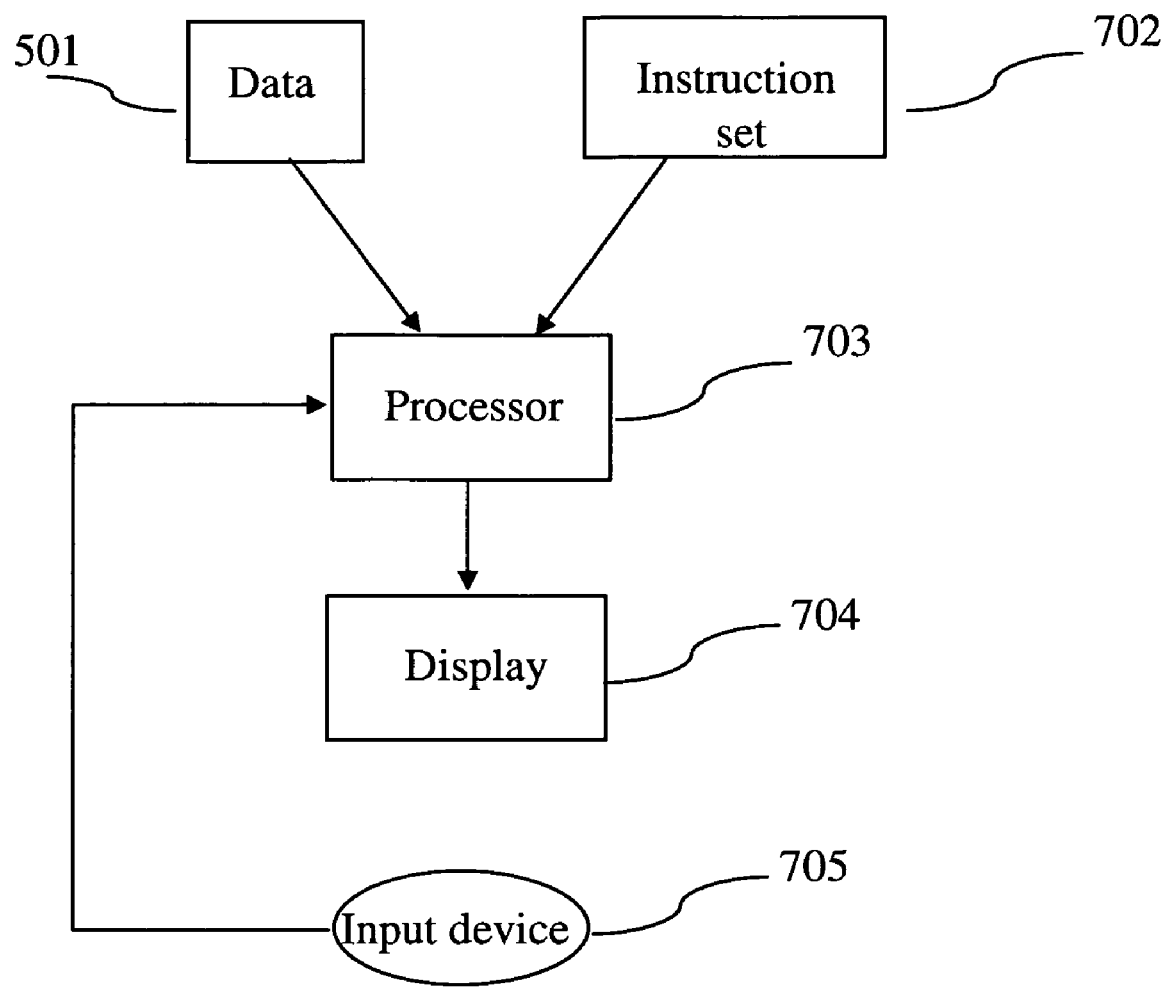
FIG. 7 illustrates a computer system that is used to perform the steps described herein in accordance with another aspect of the present invention.

The segmentation editing methods that are part of the present invention can be executed by a system as shown in FIG. 7. The system is provided with data 701 representing image or volume data including the presegmentation information. An instruction set or program 702 executing the methods of the present invention including Graph Cuts and Random Walker segmentation methods, is provided and combined with the data in a processor 703, which can process the instructions of 702 applied to the data 701 and show a resulting image on a display 704. The processor can be dedicated hardware. However, the processor can also be a CPU or any other computing device that can execute the instructions of 702. An input device 705 like a mouse, or track-ball, a keyboard or other input device allows a user to select an initial object, to position seeds or to adjust the confidence factor between added seeds and the presegmentation nodes. Consequently the system as shown in FIG. 7 provides an interactive system for editing a presegmentation.

The Multilabel Random Walker segmentation method and the possible inclusion of Prior Models was explained in detail in U.S. patent application Ser. No. 11/234,965 by Leo Grady filed on Sep. 26, 2005 entitled: System and Method for Multilabel Random Walker Segmentation Using Prior Models; and in U.S. Provisional Patent Application No. 60/641,904 by Leo Grady filed on Jan. 6, 2005 entitled: Multilabel Random Walker Segmentation Using Prior Models which both are incorporated herein by reference in their entirety. The essence of the Multilabel Random Walker segmentation method is described next.

The recently introduced random walker segmentation algorithm has been shown to have desirable theoretical properties and to perform well on a wide variety of images in practice. The algorithm was designed to be a general purpose segmentation tool, such that a user could mark a few pixels with an arbitrary number of labels and expect a quality result, regardless of the data set or the segmentation goal. A segmentation is obtained for a pixel by computing, for each label, the probability that a random walker starting its walk at that pixel first reaches a seed with that label. The pixel is then assigned the label with the greatest probability. A user-specified seed is a pixel that has been given a labeling by the user. It has been shown that the probabilities can be computed analytically by solving a sparse, symmetric, positive-definite system of linear equations instead of performing an actual random walk simulation.

Specifically, it was shown in this inventor's application titled "System and Method for Multi-Label Image Segmentation", U.S. patent application Ser. No. 11/029,442, filed Jan. 5, 2005, the contents of which are incorporated herein by reference, that the random walker algorithm has the following properties:

1. The solution for the probabilities is unique.
2. The expected value of the probabilities for an image of pure noise, given by identically distributed (not necessarily independent) random variables, is equal to those obtained on a uniform image.
3. The expected value of the probabilities in the presence of random, uncorrelated weights is equal to the probabilities obtained by using weights equal to the mean of each random variable.

The random walker algorithm has three properties. First, each segment must be connected to a seed. Second, only intensity gradients are used, instead of employing absolute intensity information. Third, the algorithm requires user supplied labels. These properties are desirable for many segmentation tasks. For example, ignoring absolute intensity information increases robustness to quantization, shifts or inverted intensities, and requiring connectedness of each segment to a seed prevents a noisy scattered segmentation of small regions. However, segmentation of an image where the objects of interest have a great many disconnected pieces is tedious for the user, since a seed should placed inside each disconnected piece. If as consistent intensity profile characterizes an object of interest, then this information should be incorporated into the segmentation. Finally, one could have an object intensity model, but use input could be unavailable.

The following references are generally descriptive of the background of the present invention and are hereby incorporated herein by reference: [1] L. Grady and G. Funka-Lea, "Multi-label image segmentation for medical applications based on graph-theoretic electrical potentials," in *Computer Vision and Mathematical Methods in Medical and Biomedical Image Analysis. ECCV* 2004 *Workshops CVAMIA and MMBIA,* ser. Lecture Notes in Computer Science, M. Sonka, I. A. Kakadiaris, and J. Kybic, Eds., no. LNCS3117. Prague, Czech Republic: Springer, May 2004, pp. 230-245; [2] Y. Boykov and M.-P. Jolly, "Interactive graph cuts for optimal boundary & region segmentation of objects in N-D images" in *International Conference on Computer Vision*, vol. I, July 2001, pp. 105-112; [3] J. A. Sethian. *Level Set Methods and Fast Marching Methods*, ser. Cambridge Monograph on Applied and Computational Mathematics. Cambridge University Press, 1999; [4] M. Kass. A. Witkin, and D. Terzopoulos, "Snakes: Active contour models," *International Journal of Computer Vision*, vol. 1, no. 4, pp. 321-331, 1987; [5] M. S. Leventon, W. B. L Grimson, and O. Faugeras, "Statistical shape influence in geodesic active contours," in *Proc. Conf Computer Vision and Pattern Recognition*, vol. 1, Hilton Head Island, S.C., Jun. 13-15, 2000, pp. 316-323; [6] D. Cremers, F. Tischhäuser, J. Weickert, and C. Schnörr, "Diffusion snakes: Introducing statistical shape knowledge into the Mumford-Shah functional," *International Journal of Computer Vision*, vol. 50, no. 3, pp. 295-313, December 2002; [7] Y. Boykov, O. Veksler, and R. Zabih, "Fast approximate energy minimization via graph cuts," *IEEE Transactions on Pattern Analysis and Machine Intelligence*, vol. 23, no. 11, pp. 1222-1239, November 2001; [8] U.S. Provisional Patent Application No. 60/641,904 by Leo Grady filed on Jan. 6, 2005 entitled: Multilabel Random Walker Segmentation Using Prior Models; [10] L. Grady, "Multilabel random walker image segmentation using prior models," in *Proceedings of CVPR* 2005, in press (See also http://cns.bu.edu/~lgrady/grady2005multilabel.pdf for same); [9] Kang, Y., Engelke, K., Kalender, W. A.: Interactive 3D editing tools for image segmentation. Medical Image Analysis 8 (2004) 35-46; [10] Falcão, A. X., Udupa, J. K., Samarasekera, S., Sharma, S., Elliot, B. H., de A. Lotufo, R.: User-steered image segmentation paradigms: Live wire and live lane. Graphical Models and Image Processing 60 (1998) 233-260; [11] Mortensen, E., Barrett, W.: Interactive segmentation with intelligent scissors. Graphical Models in Image Processing 60(5) (1998) 349-384; [13] Elder, J. H., Goldberg, R. M.: Image editing in the contour domain. IEEE Transactions on Pattern Analysis and Machine Intelligence 23(3) (2001) 291-296; [14] Boykov, Y., Jolly, M. P.: Interactive organ segmentation using graph cuts. In: Medical Image Computing and Computer-Assisted Intervention, Pittsburgh, Pa. (2000) 276-286; [15] Lefohn, A. E., Cates, J. E., Whitaker, R. T.: Interactive, GPU-based level sets for 3D segmentation. In: Medical Image Computing and Computer Assisted Intervention (MICCAI). (2003) 564-572; [16] Grady, L.: Multilabel random walker image segmentation using prior models. In: Proceedings of the 2005 IEEE Computer Society Conference on Computer Vision and Pattern Recognition. Volume 1 of CVPR., San Diego, IEEE, IEEE (2005) 763-770; [17] Cootes, T. F., Hill, A., Taylor, C. J., Haslam, J.: Use of active shape models for locating structures in medical images. Image Vision Comput. 12(6) (1994) 355-365; [18] Rousson, M., Paragios, N.: Shape priors for level set representations. In: Proc. of ECCV 2002. Volume 2. (2002) 78-92; [19] Kumar, M. P., Torr, P. H., Zisserman, A.: OBJ CUT. In: Proc. of CVPR 2005. Volume 1. (2005) 18-25; [20] Freedman, D., Zhang, T.: Interactive graph cut based segmentation with shape priors. In: Proceedings of the IEEE Computer Society Conference on Computer Vision and Pattern Recognition (CVPR) Volume 1. (2005) 755-762; [21] Harary, F.: Graph Theory. Addison-Wesley (1994); and [22] U.S. patent application Ser. No. 11/234,965 by Leo Grady filed on Sep. 26, 2005 entitled: System and Method for Multilabel Random Walker Segmentation Using Prior Models.

In the present disclosure, the term "pixel" is used to indicate a data structure that is used to compose an image. Although the term typically indicates a two-dimensional element, for purposes of the following disclosure, "pixel" is also intended to include three-dimensional picture elements, i.e., voxels.

While there have been shown, described and pointed out fundamental novel features of the invention as applied to preferred embodiments thereof, it will be understood that various omissions and substitutions and changes in the form and details of the device illustrated and in its operation may be made by those skilled in the art without departing from the spirit of the invention. It is the intention, therefore, to be limited only as indicated by the scope of the claims appended hereto.

The invention claimed is:

1. A method for processing an object in a set of image data comprising:
    presegmenting the object into a presegmentation using a first segmentation process;
    analyzing the presegmentation and determining a weighting factor based on the analysis of the presegmentation;
    placing one or more seeds in the set of image data;
    segmenting by a processor of the object using a second segmentation process using the seeds and the weighting factor and the presegmentation, wherein the first and the second segmentation processes are different types of segmentation processes; and
    wherein the weighting factor is a function of a distance of the presegmented object from one or more seeds, wherein the weighting factor is a function of a minimum distance between presegmentation and seeds expressed as $$\gamma_i = \kappa \exp\left(-\frac{d(v_i, v_j)}{\sigma}\right),$$

wherein the factors $\kappa$ and $\sigma$ are user controlled constants, $\gamma_i$ is the weighting factor $v_i$ and $v_j$ are nodes and $d(v_i, v_j)$ is the minimum distance from $v_i$ to all $v_j \in$ F, B with F and B being foreground and background respectively.

2. The method of claim 1, wherein the weighting factor is interactively modified by changing $\kappa$ or $\sigma$.

3. The method of claim 1, wherein the second segmentation process is a graph cuts method.

4. The method of claim 1, wherein the second segmentation process is a random walker method.

5. The method of claim 1, wherein the step of segmenting the object using the second segmentation process with one or more seeds, the results of the first segmentation process and the weighting factor includes minimizing an energy expression $$Q(x) = \sum_{e_{ij}} w_{ij}(x_i - x_j)^2 + \gamma\left(\sum_i (1 - p_i)x_i + \sum_i p_i(1 - x_i)\right),$$

wherein $e_{ij}$ denotes an edge, spanning two nodes, $w_{ij}$ is a weight of an edge $e_{ij}$, $p_i$ denotes a presegmentation of a node, $x_i$ and $x_j$ represent a constraint for nodes $v_i$ and $v_j$ respectively and $\gamma$ is the weighting factor.

6. The method of claim 5, wherein the minimization of the energy expression is constrained by editing sets of nodes.

7. The method of claim 1, wherein one or more additional seeds are added to the set of image data.

8. A system for segmenting an object in a set of image data using one or more presegmented objects, comprising:
    a processor;
    computer software operable on the processor, the computer software being capable of:
    presegmenting the object into a presegmentation using a first segmentation process;
    analyzing the presegmentation and determining a weighting factor based on the analysis of the presegmentation;

placing one or more seeds in the set of image data;

segmenting the object using a second segmentation process using the seeds and the weighting factor and the presegmentation, wherein the first and the second segmentation processes are different types of segmentation processes; and wherein the step of segmenting the object using a second segmentation process with one or more seeds, the presegmentation and the weighting factor includes minimizing an energy expression $$Q(x) = \sum_{e_{ij}} w_{ij}(x_i - x_j)^2 + \gamma\left(\sum_i (1-p_i)x_i + \sum_i p_i(1-x_i)\right),$$

wherein $e_{ij}$ denotes an edge spanning two nodes, $w_{ij}$ is a weight of an edge e denotes a presegmentation of a node, $x_i$ and $x_j$ represent a constraint for nodes $v_i$ and $v_j$ respectively and $\gamma$ is the weighting factor.

9. The system of claim 8, wherein the second segmentation process is a graph cuts method.

10. The system of claim 8, wherein the second segmentation process is a random walker method.

11. The system of claim 8, wherein the weighting factor is a function of a distance of the presegmented object from one or more seeds.

12. The system of claim 8, wherein the weighting factor is a function of a minimum distance between presegmentation and seeds expressed as $$y_i = \kappa\exp\left(-\frac{d(v_i, v_j)}{\sigma}\right),$$

wherein the factors κ and σ are user controlled constants, $\gamma_i$ is the weighting factor $v_i$ and $v_j$ are nodes and $d(v_i,v_j)$ is a minimum distance from $v_i$ to all $v_j \in$ F, B with F and B being foreground and background respectively.

13. The system of claim 12, wherein the weighting factor is interactively modified by changing κ or σ.

14. The system of claim 8, wherein the minimization of the energy expression is constrained by editing sets of nodes.

15. The system of claim 8, wherein one or more seeds are added to the set of image data.

16. The system of claim 8 wherein the weighting factor is interactively modified.

17. A system for segmenting an object in a set of image data using one or more presegmented objects, comprising:

a processor;

computer software operable on the processor, the computer software being capable of:

presegmenting the object into a presegmentation by using a first segmentation process;

analyzing the presegmentation and determining a weighting factor based on the analysis of the presegmentation;

placing one or more seeds in the set of image data; and segmenting the object using a second segmentation process using the seeds and the weighting factor and the results from the first segmentation process; and wherein the weighting factor is a function of a minimum distance between presegmentation and seeds expressed as $$\gamma_i = \kappa\exp\left(-\frac{d(v_i, v_j)}{\sigma}\right),$$

and wherein the factors κ and σ are user controlled constants, $\gamma_i$ is the weighting factor $v_i$ and $v_j$ are nodes and $d(v_i,v_j)$ is a minimum distance from $v_i$ to all $v_j \in$ F, B with F and B being foreground and background respectively.

* * * * *